W. KIESER.
LEAKAGE REDUCING DEVICE.
APPLICATION FILED APR. 29, 1911.

1,041,485.

Patented Oct. 15, 1912.

Witnesses:
Marcus L. Byng.
J. Ellis Glen.

Inventor,
Walter Kieser,
by Albert G. Davis
Att'y

UNITED STATES PATENT OFFICE.

WALTER KIESER, OF CHARLOTTENBURG, GERMANY, ASSIGNOR TO GENERAL ELECTRIC COMPANY, A CORPORATION OF NEW YORK.

LEAKAGE-REDUCING DEVICE.

1,041,485.  Specification of Letters Patent.  Patented Oct. 15, 1912.

Application filed April 29, 1911.  Serial No. 624,230.

*To all whom it may concern:*

Be it known that I, WALTER KIESER, a citizen of Switzerland, residing at Charlottenburg, Germany, have invented certain new and useful Improvements in Leakage-Reducing Devices, of which the following is a specification.

The present invention relates to devices for reducing the leakage of fluid around a shaft where it passes through a wall whose opposite sides are subjected to different pressures.

The object of my invention is to provide a leakage reducing device of improved construction and one which is capable of assuming different positions as the part to be packed is displaced from its true position, and of returning automatically to its proper position when the part to be packed is restored to its proper or normal position.

An important feature of my improved device resides in the fact that it is equally effective whether the part to be packed is running in its true position or not.

The device of my invention is intended more especially for steam turbines, but it is of general application.

Figure 1:
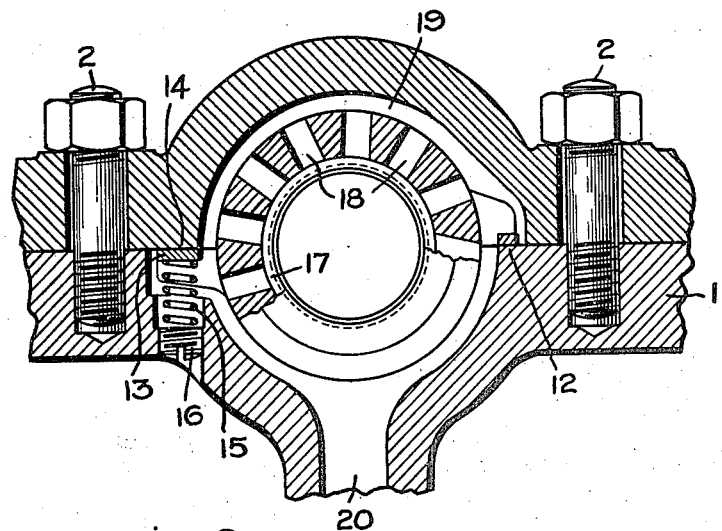
Figure 2:
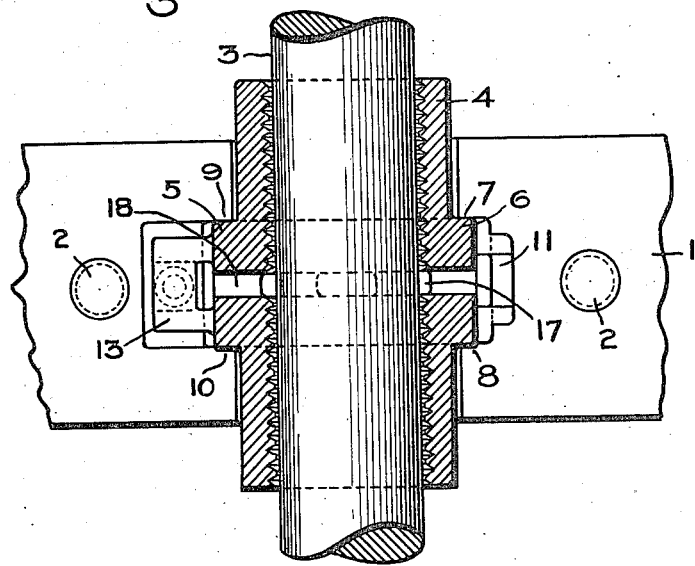

In the accompanying drawing, which illustrates one of the embodiments of my invention, Figure 1 is a cross-section of a leakage reducing device; and Fig. 2 is a longitudinal section thereof.

1 indicates a casing composed of two parts which are united by bolts 2. Located within the casing and surrounding the shaft 3 is a tubular packing or leakage reducing member 4. The bore of this member is provided with serrations to decrease the leakage around the shaft. The central portion of said member is provided with projections 5 and 6 arranged diametrically opposite. The projection 6 engages shoulders 7 and 8 on the upper part of the casing on the right-hand side, to prevent the tubular member from shifting back and forth in an axial direction. The projection 5 on the left-hand side engages the shoulders 9 and 10 formed on the lower part of the casing for the same purpose. In addition to preventing axial movement of the member 4, these projections serve to support the member free of the shaft. For example, the part 11 of the right-hand projection, rests upon the abutment or ledge 12 formed on the lower part of the casing 1. The opposite projection is provided with a similar part 13 which engages a ledge or abutment 14 formed on the upper part of the casing. The surfaces which engage the portions 12 and 14 are flat so that the packing member as a whole can move slightly from one side to the other as the shaft is thrown out of line due to any cause. The projection 13 is pressed upwardly against the abutment 14 by a coil adjusting spring 15. The tension of this spring may be adjusted by the adjusting screw 16. The central portion of the member is provided with an annular groove 17 that communicates with a series of radial openings 18 that in turn communicate with an annular chamber 19, the latter being connected by the conduit 19 with a stage or compartment of lower pressure. Any steam leaking through the clearance between the shaft and the member 4 will be caught in the annular groove 17 and pass from it through the passages 18 to chamber 19 and thence by the conduit 20 to a point of lower pressure.

The operation of my improved packing is as follows: It will be noted that the projection 6—11 is held on the abutment by the weight of the member while the projection 5—13 is pressed against its abutment by means of the spring 15. This is the normal working arrangement of the parts. Assuming now that the shaft is bent upwardly for any cause, then the member 4 will move upwardly with the shaft, the part 13 acting as a pivot. This arrangement also permits the parts to move slightly to the right or left. On the other hand, assuming that the shaft is bent downward from any cause, the part 11 resting on its abutment forms the pivot and the member is moved downwardly by the shaft against the action of the compression spring 15. When the shaft returns to its normal operating condition the member 4 will also return.

Owing to the fact that the member 4 is movable as a unit and has no axial joints which open when the shaft is deflected or distorted, it follows that said member will be as effective in one position as another.
This is a very advantageous feature of my invention.

The packing is designed primarily for horizontal shafts but it may be used for vertical shafts.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is,—

1. In a device of the character described, the combination of a rotating element, a leakage reducing member which surrounds said element, abutments located on opposite sides of the axis of said member and coöperating therewith to determine its position, one of said abutments preventing downward movement of one side of the member but permitting upward movement thereof, a yielding means that normally holds the other side of the member in engagement with the other abutment and permits movement downward from said abutment, and a casing by which the abutments are carried, there being a clearance space in the casing around the member to permit said member to move about either abutment as a fulcrum as it follows the movements of the rotating element.

2. In a device of the character described, the combination of a movable element, a tubular member which surrounds said element and is free to follow the movements of the element from its normal position, abutments arranged on opposite sides of the axis of said member and on opposite sides of a diameter thereof, projections on the member, one of which normally rests on an abutment, and a spring device arranged substantially at right angles to said diameter that engages the other projection and yieldingly presses it against the other abutment.

3. In a device of the character described, the combination of a rotating element, a leakage reducing member which surrounds said element and is free to follow the movements of the element from its normal position, abutments arranged on opposite sides of the axis of the said member, projections on said member, one of which rests on the top of an abutment while the other projection is pressed against the bottom of the other abutment, and spring means that engages the second projection and presses it against its abutment.

4. In a device of the character described, the combination of a moving element, a leakage reducing member which surrounds the element and is free to follow the movements of the element from its normal position, shoulders on the member, a casing that contains the member and engages the shoulders to prevent axial movement of said member, projections on the member, diametrically opposite abutments on the casing, one of the projections being supported by one abutment, and means that engages the other projection and yieldingly supports it and normally holds it in engagement with the other abutment.

5. In a device of the character described, the combination of a moving element, a leakage reducing member that surrounds the element and is provided with a fluid conveying passage between its ends, a conduit communicating with the passage for carrying off leakage fluid, a casing for the member having abutments, projections on the member which engage the abutments, the said projections being free to move on the abutments, and yielding means for holding one of the projections against its coöperating abutment.

6. In a device of the character described, the combination of a moving element; a leakage reducing member that surrounds the element, an annular groove formed in the member, radial passages communicating therewith, a casing, a chamber in the casing that receives fluid from the passages, a conduit for discharging fluid from the chamber, projections on the member that engage the casing, and a spring for holding one of the projections in contact with the casing.

7. In a device of the character described, the combination of a moving element, a packing sleeve through which said element extends, said sleeve being free to follow the movements of the element from its true position, stationary abutments which engage the packing sleeve and normally fix its position with respect to the moving element, and an elastic means which automatically returns the sleeve to its initial position in engagement with the abutments after it has been shifted by said element.

In witness whereof, I have hereunto set my hand this 10th day of April, 1911.

WALTER KIESER.

Witnesses:
FRANZ SCHOERNER,
ERNST MÖHN.